Patented July 21, 1953

2,646,409

UNITED STATES PATENT OFFICE 2,646,409

AZAMEROCARBOCYANINE DYES

Leslie G. S. Brooker and Frank L. White, Rochester, N. Y., assignors to Eastman Kodak Company, Rochester, N. Y., a corporation of New Jersey No Drawing. Application July 22, 1949, Serial No. 106,314

12 Claims. (Cl. 260—240.1)

This invention relates to azamerocarbocyanine dyes and to a process for preparing the same.

A few azamerocarbocyanine dyes have been prepared by condensing 4-(α-ethoxyethylidene)-3-methyl-1-phenyl-5-pyrazolone with 2-aminobenzothiazole alkyl quaternary salts. See British Patent 544,647, accepted April 22, 1942, for example. Such azamerocarbocyanine dyes have the following formula:

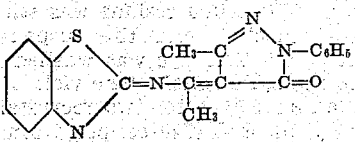

In these known dyes the nitrogen atom of the

group is not contiguous to the pyrazolone nucleus.

We have now found azamerocarbocyanine dyes in which the nitrogen atom of the =CH—N= group is adjacent to the pyrazolone nucleus. While the azamerocarbocyanine dyes heretofore obtained are useful in altering the sensitivity of photographic silver halide emulsions, many of the dyes of our invention have little or no effect when used as sensitizers for such emulsions. Quite unexpectedly, we have found, however, that many of the dyes of our invention are excellent supersensitizers for certain cyanine dyes, many of which have no sensitizing effect in their own right.

It is accordingly an object of our invention to provide new azamerocarbocyanine dyes. A further object is to provide a process for preparing such dyes. Other objects will become apparent from a consideration of the following description and examples.

The azamerocarbocyanine dyes of our invention can be represented by the following general formula:

I. 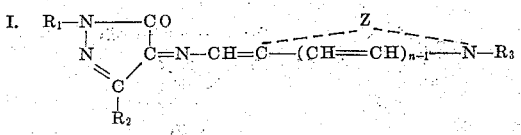

wherein $R_1$ and $R_2$ each represents an aryl group, e. g. phenyl, p-tolyl, m-tolyl, o-tolyl, p-carboxyphenyl, p-sulfophenyl, m-carbomethoxyphenyl, m-carbethoxyphenyl, 4 - bromophenyl, β - naphthyl, α-naphthyl, 4-sulfo-α-naphthyl, etc. groups, or an alkyl group, e. g. methyl, ethyl, n-propyl, isopropyl, n-butyl, isobutyl, etc. groups (e. g. an alkyl group of the formula $C_mH_{2m+1}$ wherein $m$ is a positive integer from 1 to 4), $R_1$ in addition represents a benzothiazolyl group, $n$ represents a positive integer from 1 to 2, $R_3$ represents an alkyl group (i. e. an alcohol radical), e. g. methyl, ethyl, n-propyl, isobutyl, n-butyl, n-amyl, isoamyl, β-hydroxyethyl, γ-hydroxypropyl, β-methoxyethyl, β-ethoxyethyl, allyl (vinylmethyl), β-methallyl (isopropenylmethyl), benzyl (phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, β - sulfoethyl, phenylmercaptomethyl, phenoxymethyl, β-phenylmercaptoethyl, β-phenoxyethyl, etc., and Z represents the nonmetallic atoms necessary to complete a heterocyclic nucleus selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4 - (2 - thienyl) thiazole, etc.), those of the benzothiazole series (e. g. benzothiazole, 4 - chlorobenzothiazole, 5 - chlorobenzothiazole, 6 -chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5 - hydroxybenzothiazole, 6 - hydroxybenzothiazole, etc.), those of the naphthothiazole series (e. g. α-naphthothiazole, β-naphthothiazole, 5-methoxy-β-naphthothiazole, 5-ethoxy-β - naphthothiazole, 8 - methoxy - α-naphthothiazole, 7-methoxy-α-naphthothiazole, etc.), those of the thionaphtheno-7',6',4,5-thiazole series (e. g. 4'-methoxythionaphtheno - 7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5 - phenylbenzoxazole, 6 - methylbenzoxazole, 5,6-dimethylbenzoxazole, 4,6-dimethylbenzoxazole, 5 - methoxybenzoxazole, 5-ethoxybenzoxazole, 6-methoxybenzoxazole, 5-hydroxybenzoxazole, 6 - hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5 - methoxybenzoselenazole, 5 - hydroxybenzoselenazole, tetrahydrobenzoselenazole, etc.), those of the naphthoselenazole series (e. g. $\alpha$-naphthoselenazole, $\beta$-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8 - methylquinoline, 6 - chloroquinoline, 8 - chloroquinoline, 6 - methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc), those of the 3,3-dialkylindolenine series (e. g. 3,3-dimethylindolenine, 3,3,5 - trimethylindolenine, 3,3,7-trimethylindolenine, etc.), the pyridine series (e. g. pyridine, 5-methylpyridine, etc.), etc. In addition, $R_3$ can represent an aryl group, e. g. phenyl, 4-chlorophenyl, etc. when Z represents the non-metallic atoms necessary to complete a heterocyclic nucleus of the thiazole, thiazoline, benzothiazole or 3,3-dialkylindolenine series.

According to the process of our invention, we prepare the compounds represented by Formula I above by condensing a cyclammonium quaternary salt with an isonitrosopyrazolone. As cyclammonium quaternary salts, those represented by the following general formula can be used:

II.
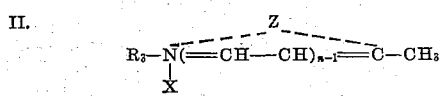

wherein Z, $R_3$ and $n$ have the values set forth above, and X represents an anion, e. g. chloride, bromide, iodide, thiocyanate, sulfamate, methylsulfate, ethylsulfate, perchlorate, benzenesulfonate, p-toluenesulfonate, xylenesulfonate, etc.

As isonitrosopyrazolones those represented by the following general formula can be used:

III.
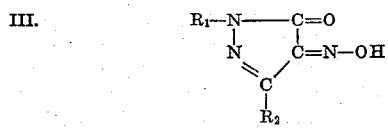

wherein $R_1$ and $R_2$ have the values set forth above. The compounds represented by Formula III can be prepared by reacting a pyrazolone selected from those represented by the following general formula:

IV.
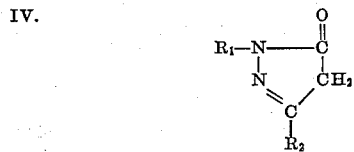

wherein $R_1$ and $R_2$ have the values set forth above, with sodium nitrite in the presence of acetic acid.

The condensations of our invention can advantageously be carried out in the presence of an alkali metal carboxylate, such as sodium acetate, potassium acetate, sodium butyrate, etc. (e. g. an alkali metal salt of a carboxylic acid containing from 2 to 4 carbon atoms) in a carboxylic anhydride, such as acetic, propionic, n-butyric, etc. anhydrides (e. g. an anhydride of a carboxylic acid containing from 2 to 4 carbon atoms). Heat accelerates the reaction, and temperatures varying from about 25° C. to the reflux temperature of the reaction mixture can be used.

The following examples will serve to illustrate more fully the manner whereby we practice our invention.

*Example 1.*—3 - methyl - 1-phenyl-4-[(1,3,3-trimethyl - 2(1) - indolylidene)-methylimino]-5-pyrazolone

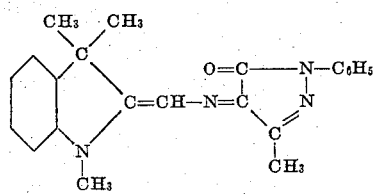

A mixture of 2.03 g. (1 mol.) of 4-isonitroso-3-methyl-1-phenyl-5-pyrazolone, 3.01 g. (1 mol.) of 2,3,3-trimethylindolenine methiodide, and 1.23 g. (1 mol+50% excess) of fused sodium acetate in 15 cc. of acetic anhydride was heated at the refluxing temperature for 5 minutes, and the reaction mixture was chilled overnight at 0° C. It was stirred with several successive portions of cold water. The crude residue was stirred with hot methyl alcohol, and the suspension was chilled at 0° C. The dye was washed onto the filter with methyl alcohol. The yield of dye was 26% crude and 11% after two recrystallizations from methyl alcohol (220 cc. per gram of dye). The red crystals with green reflex had a melting point of 205°–206° C. with decomposition, and softened at 185° C.

*Example 2.*—4-[(3-ethyl-2(3)-$\alpha$-naphthoxazolylidene)methylimino]-3-methyl-1 - phenyl - 5-pyrazolone

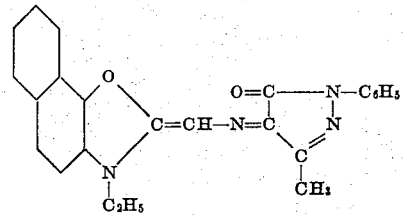

This dye was prepared exactly as the dye of Example 1, except that 3.39 g. (1 mol.) of 2-methyl-$\alpha$-naphthoxazole ethiodide were used in place of the 2,3,3-trimethylindolenine methiodide. The dye was purified by dissolving it in 10 cc. of pyridine and precipitating the dye by adding methyl alcohol. It was obtained as minute reddish-orange crystals having a melting point of 214°–216° C. with decomposition.

*Example 3.*—3 - methyl - 4-[(3-methyl-2(3)-thiazolinylidene)methylimino]-1-phenyl - 5 - pyrazolone

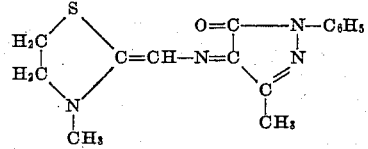

This dye was prepared exactly as the dye of Example 1, except that 3.43 g. (1 mol.) of 2-methylthiazoline methiodide were used in place of the 2,3,3-trimethylindolenine methiodide. The yield of dye after recrystallization from methyl alcohol (215 cc. per gram of dye) was 15%, and it was obtained as red crystals with a green reflex. It had a melting point of 237°–238° C. with decomposition.

*Example 4.—4 - [(3-ethyl-2(3)-benzothiazolylidene) methylimino]-3-methyl - 1 - phenyl - 5-pyrazolone*

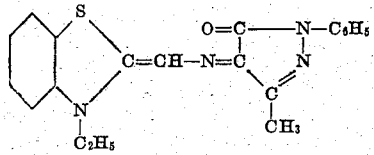

A mixture of 2.03 g. (1 mol.) of 4-isonitroso-3-methyl-1-phenyl-5-pyrazolone, 3.49 g. (1 mol.) of 2-methylbenzothiazole etho-p-toluenesulfonate and 1.23 g. (1 mol.+50% excess) of fused sodium acetate in 40 cc. of acetic anhydride was heated at the refluxing temperature for 3 minutes. The cold reaction mixture was stirred with several successive portions of cold water. The crude residue was stirred with hot methyl alcohol and the suspension was chilled at 0° C. The dye was collected on a filter and washed with methyl alcohol. The yield of dye was 11% crude and 6% after two purifications from pyridine plus methyl alcohol to precipitate the dye. The needles with a dark green reflex had melting point 256–257° C. with decomposition.

*Example 5.—4-[(1-ethyl-2(1)-β-naphthothiazolylidene) methylimino] - 3 - methyl-1-phenyl-5-pyrazolone*

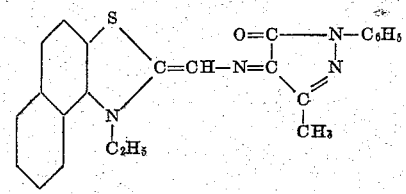

This dye was prepared in exactly the same manner as the dye of Example 4, except that 3.99 g. (1 mol.) of 2-methyl-β-naphthothiazole etho-p-toluenesulfonate were employed in place of the 2-methylbenzothiazole etho-p-toluenesulfonate. The yield of crude dye was 24% and 19% after two recrystallizations from pyridine. It was obtained as blue needles which reddened at about 270° C. and decomposed with the evolution of gas at 279° C.

*Example 6.—4-[(3 - ethyl - 2(3) - benzoxazolylidene) methylimino] - 3 - methyl-1-phenyl-5-pyrazolone*

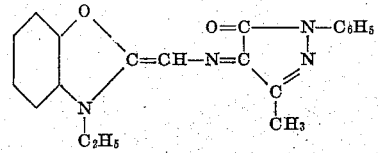

A mixture of 2.03 g. (1 mol.) of 4-isonitroso-3-methyl-1-phenyl-5-pyrazolone, 2.89 g. (1 mol.) of 2-methylbenzoxazole ethiodide and 1.23 g. (1 mol.+50% excess) of fused sodium acetate in 25 cc. of acetic anhydride was heated at the refluxing temperature for 10 minutes. The cold reaction mixture was stirred with several successive portions of cold water. The residue then was stirred with hot methyl alcohol. After chilling at 0° C., the solid was washed onto the filter with methyl alcohol. The yield of dye was 11% crude and 3% after two recrystallizations from methyl alcohol. The very dark crystals had a melting point of 220°–222° C. with decomposition.

*Example 7.—4-[(3-ethyl-4-methyl-2(3)-thiazolylidene) methylimino] - 3 -methyl-1-phenyl-5-pyrazolone*

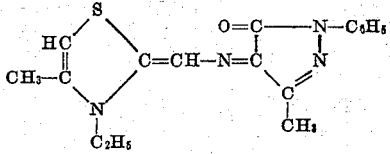

This dye was prepared in the same manner as the dye of Example 6, except that 2.6 g. (1 mol.) of 2,4-dimethylthiazole ethiodide were used in place of the 2-methylbenzoxazole ethiodide. The yield of dye was 34% crude and 14% after two recrystallizations from methyl alcohol (215 cc. per gram of dye). The pure dye was obtained as dark red crystals with a green reflex and had a melting point of 186°–187° C. with decomposition.

*Example 8.—1-(2-benzothiazolyl)-4-[(3 - ethyl-2 (3) - benzothiazolylidene) methylimino] - 3 - methyl-5-pyrazolone*

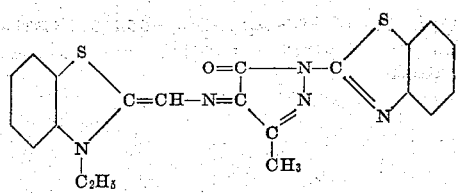

A mixture of 1.30 g. (1 mol.) of 1-(2-benzothiazolyl)-4-isonitroso-3-methyl-5-pyrazolone, 1.75 g. (1 mol.) of 2-methyl-benzothiazole etho-p-toluenesulfonate and 0.62 g. (1 mol.+50% excess) of fused sodium acetate in 20 cc. of acetic anhydride was heated at the refluxing temperature for about 2 minutes. The cold reaction mixture was stirred with several successive portions of cold water. The solid was collected on a filter and washed with cold water. The residue was stirred, in a beaker, with methyl alcohol, and then washed onto a filter with methyl alcohol. This solid was dissolved in 30 cc. of pyridine and on cooling there separated 0.35 g. of dye. This portion was recrystallized from pyridine. The crystalline powder with green reflex was obtained in 14% yield, and it had a melting point above 300° C.

*Example 9.— 3-methyl-1-m-tolyl-4-[(1,3,3-trimethyl - 2(1) - indolylidene) - methylimino]-5-pyrazolone*

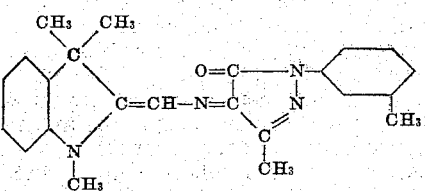

A mixture of 2.17 g. (1 mol.) of 4-isonitroso-3-methyl-1-m-tolyl-5-pyrazolone, 3.01 g. (1 mol.) of 2,3,3-trimethylindolenine methiodide and 1.23 g. (1 mol.+50% excess) of fused sodium acetate in 15 cc. of acetic anhydride was heated at the refluxing temperature for about one minute. The cold reaction mixture was stirred with about 300 cc. of cold water and the solid was collected on a filter and washed with cold water. The residue was stirred, in a beaker, with methyl alcohol. After chilling at 0° C., the dye was washed onto the filter with methyl alcohol. The yield of dye was 19% crude and 15% after two recrystallizations from methyl alcohol (100 cc. per gram of dye). The dark crystals with a metallic reflex had a melting point of 203°–204° C. with decomposition.

*Example 10. — 3-methyl-1-p-tolyl-4-[(1,3,3-trimethyl - 2(1) - indolylidene) methylimino]-5-pyrazolone*

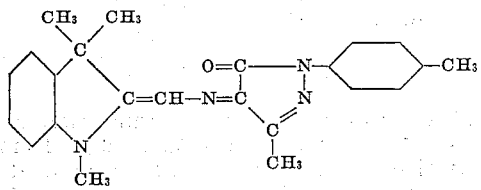

This dye was prepared in the same manner as the dye of Example 9, except that a molecularly equivalent amount of 4-isonitroso-3-methyl-1-p-tolyl-5-pyrazolone was used in place of the 4-isonitroso-3-methyl-1-m-tolyl- 5 - pyrazolone. The yield of the dye was 20% crude and 11% after two recrystallizations from methyl alcohol (280 cc. per gram of dye). The dark crystals with a green reflex had a melting point of 246°–247° C. with decomposition.

*Example 11.—4-[(3-ethyl-2(3)-benzoselenazolylidene)methylimino]-3-methyl - 1 - phenyl-5-pyrazolone*

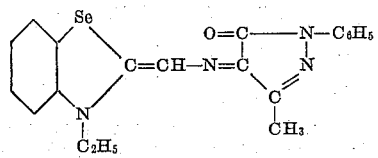

A reaction mixture consisting of 2.03 g. (1 mol.) of 4-isonitroso-3-methyl-1-phenyl-5-pyrazolone, 3.52 g. (1 mol.) of 2-methylbenzoselenazole ethiodide, 1.23 g. (1 mol. plus 50% excess) of fused sodium acetate and 15 cc. of acetic anhydride was heated at the refluxing temperature for 3 minutes. After chilling overnight at 0° C., the reaction mixture was stirred with several successive portions of cold water. The remaining residue was stirred with hot methyl alcohol and the resulting suspension was chilled at 0° C. The dye was collected on a filter and washed with methyl alcohol. The crude dye was extracted with 190 cc. of hot acetic acid and the remaining residue was dissolved in 70 cc. of pyridine. By chilling the pyridine extract 0.85 g. of dye was obtained, and a further portion (0.45 g.) was isolated by adding water to the pyridine filtrate. By chilling the acetic acid extract 0.30 g. of dye was obtained. The 0.85 g. portion was recrystallized from 20 cc. of pyridine. By chilling the pyridine solution 0.37 g. of dye was obtained. The 0.45 g. and 0.30 g. portions were combined, dissolved in a small volume of pyridine and methyl alcohol was added to the pyridine filtrate. After chilling, the dye was collected on a filter and washed with methyl alcohol. The dye weighed 0.60 g. and had a melting point of 225–227° C. with decomposition. The dark green crystals gave a bluish-red solution in methyl alcohol.

*Example 12.—1-(2-benzothiazolyl) - 4 - [(1,3-dimethyl - 2(1) - quinolylidene) methylimino]-3-methyl-5-pyrazolone*

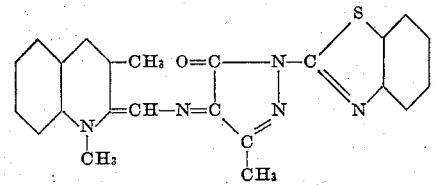

1.57 g. (1 mol.) of 2,3-dimethylquinoline and 1.86 g. (1 mol.) of methyl p-toluenesulfonate were heated together at the temperature of the steam-bath for two days. To this crude quaternary salt were added 2.60 g. (1 mol.) of 1-(2-benzothiazolyl) - 4 - isonitroso-3-methyl-5-pyrazolone, 1.23 g. (1 mol. plus 50% excess) of fused sodium acetate and 15 cc. of acetic anhydride. The reaction mixture was heated at the refluxing temperature for five minutes, cooled and stirred with ether. After chilling, the solids were collected on a filter and washed with ether. The residue was transferred to a beaker, stirred with cold water, and then the dye was collected on a filter and washed with water. After a similar treatment with methyl alcohol, the yield of dye was 27% crude and 22% after two recrystallizations from pyridine (50 cc. per gram of dye). The very dark green crystals had a melting point of 278–279° C. with decomposition. The bluish pyridine solution of this dye became purplish to reddish purple as water was added. Reversal of Kundt's rule.)

*Example 13.—1-(2-benzothiazolyl)-4-[(1-ethyl-3 - methyl-2(1)-quinolylidene)methylimino]-3-methyl-5-pyrazolone*

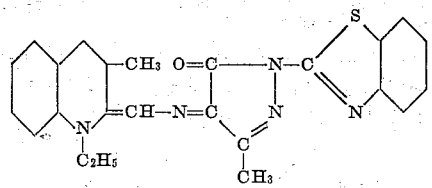

This dye was prepared in a manner similar to that of Example 2, except that a molecularly equivalent amount of 2,3-dimethylquinoline etho-p-toluenesulfonate was used in place of the 2,3-dimethylquinoline metho-p-toluenesulfonate of Example 12. The yield of dye was 33% crude and 26% after two recrystallizations from pyridine. The very dark green crystals had a melting point of 270°–271° C. with decomposition. This dye gave a dull bluish-purple solution in pyridine and a bluish-red solution in methyl alcohol, an example of the reversal of Kundt's rule.

*Example 14.—1 - (2-benzothiazolyl)-3-methyl-4-[(1-methyl-2(1)-quinolylidene)methylimino]-5-pyrazolone*

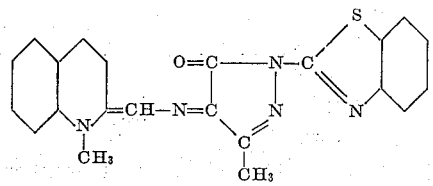

This dye was prepared in a manner similar to that of Example 12, except that a molecularly equivalent amount of quinaldine metho-p-toluenesulfonate was employed in place of the 2,3-dimethylquinoline metho-p-toluenesulfonate of Example 12. The yield of dye was 60% crude and 25% after two recrystallizations from pyridine (130 cc. per gram of dye). The green crystals had a melting point above 300° C. This dye gave a purple solution in pyridine and a bluish-red solution in methyl alcohol.

*Example 15.—1-(2-benzothiazolyl)-4-[(1-ethyl-2(1)-quinolylidene)-methylimino]-3-methyl-5-pyrazolone*

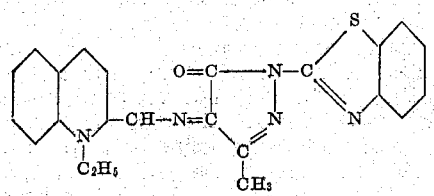

This dye was prepared in a manner similar to that of Example 12, except that a molecularly equivalent amount of quinaldine etho-p-toluenesulfonate was used in place of the 2,3-dimethylquinoline metho-p-toluenesulfonate. The yield of dye was 36% crude and 24% after two recrystallizations from pyridine (50 cc. per gram of dye). The very dark green crystals had a melting point above 300° C. This dye gave a purple solution in pyridine and a bluish-red solution in methyl alcohol.

*Example 16.—1-(2-benzothiazolyl)-3-methyl-4-[(1-methyl-4(1)-quinolylidene)methylimino]-5-pyrazolone*

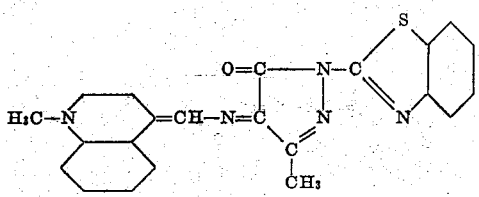

A reaction mixture consisting of 2.60 g. (1 mol.) of 1-(2-benzothiazolyl)-4-isonitroso-3-methyl-5-pyrazoline, 2.85 g. (1 mol.) of lepidine methiodide, 1.23 g. (1 mol. plus 50% excess) of sodium acetate and 15 cc. of acetic anhydride was heated at the refluxing temperature for 5 minutes. The cool mixture was stirred with ether. After chilling, the solids were collected on a filter and washed with ether. The residue was transferred to a beaker, stirred with cold water, and then the dye was collected on a filter and washed with water. After a similar treatment with methyl alcohol the yield of dye was 43% crude and 20% after two recrystallizations from pyridine (420 cc. per gram of dye). The very dark green crystals had a melting point of 303°–304° C. with decomposition. This dye gave a deep blue solution in pyridine and a purplish solution in methyl alcohol.

*Example 17.—1-(2-benzothiazolyl)-3-methyl-4-[(1-methyl-2(1)-pyridylidene)methylimino]-5-pyrazolone*

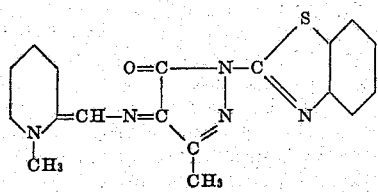

This dye was prepared in a manner similar to that of Example 16, except that a molecularly equivalent amount of α-picoline methiodide was employed in place of the lepidine methiodide in Example 16. The yield of dye was 40% crude and 6% after two recrystallizations from pyridine. The reddish-orange crystals had a melting point of 303°–304° C. with decomposition. This dye gave a crimson solution in pyridine and a deep yellow solution in methyl alcohol.

*Example 18.—1-(2-benzothiazolyl)-3-methyl-4-[(2-methyl-1(2)-isoquinolylidene)methylimino]-5-pyrazolone*

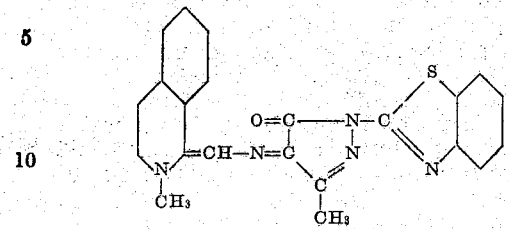

This dye was prepared in a manner similar to that used in Example 16, except that a molecularly equivalent amount of 1-methylisoquinoline methiodide was employed in place of the lepidine methiodide in Example 16. The yield of dye was 55% crude and 40% after two recrystallizations from pyridine (60 cc. per gram of dye). The dark green crystals had a melting point of 261°–262° C. with decomposition. This dye gave a purple solution in pyridine and a reddish solution in methyl alcohol.

The isonitrosopyrazolones used in the above examples were prepared as follows:

*Example 19.—4-isonitroso-3-methyl-1-phenyl-5-pyrazolone*

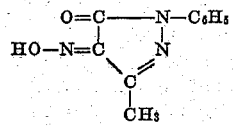

A cold solution of 13.8 g. (1 mol.) of sodium nitrite in 50 cc. of water was added to a chilled solution of 34.8 g. (1 mol.) of 3-methyl-1-phenyl-5-pyrazolone in 75 cc. of acetic acid with stirring. The whole soon set to a stiff mass and 100 cc. of water was added with stirring. The reaction mixture was allowed to stand at room temperature for 20 minutes, stirred with 200 cc. of water, and the solid was collected on a filter and washed with cold water. The moist residue was dissolved in about 125 cc. of hot ethyl alcohol. The first crop of light orange crystals weighed 32.3 g. and they had a melting point of 158°–159° C.

*Example 20.—1-(2-benzothiazolyl)-4-isonitroso-3-methyl-5-pyrazolone*

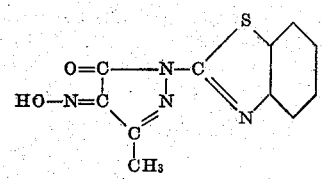

A cold solution of 3.45 g. (1 mol.) of sodium nitrite in 25 cc. of water was added to a chilled suspension of 11.55 g. (1 mol.) of 1-(2-benzothiazolyl)-3-methyl-5-pyrazolone in 100 cc. of acetic acid with stirring. After standing at room temperature for 30 minutes the reaction mixture was chilled at 0° C. The solid was collected on a filter and washed with cold water. The greenish-yellow crystals from pyridine had a melting point of 274°–275° C. with decomposition.

*Example 21.—4-isonitroso-3-methyl-1-p-tolyl-5-pyrazolone*

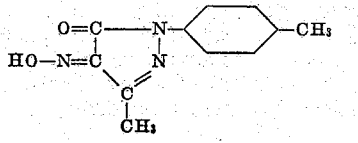

A cold solution of 3.45 g. (1 mol.) of sodium nitrite in 25 cc. of water was added to a chilled solution of 9.4 g. (1 mol.) of 3-methyl-1-p-tolyl-5-pyrazolone in 50 cc. of acetic acid with stirring. Solid separated and 50 cc. of water was added with some stirring. The reaction mixture was allowed to stand at room temperature for 30 minutes and then chilled at 0° C. The solid was collected on a filter and washed with cold water. The yield of product was 100% crude and 71% after two recrystallizations from methyl alcohol (8 cc. per gram of product). The light orange needles had melting point 180°–181° C.

*Example 22.—4-isonitroso-3-methyl-1-m-tolyl-5-pyrazolone*

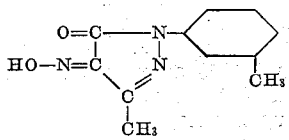

This compound was prepared in the same manner as the product of Example 21, except that a molecularly equivalent amount of 3-methyl-1-m-tolyl-5-pyrazolone was used in place of the corresponding p-tolyl compound. After recrystallization from ethyl acetate, it was obtained as yellowish-orange needles having a melting point of 162°–163° C.

As pointed out above, while many of the azamerocarbocyanine dyes of our invention have little or no sensitizing effect on photographic silver halide emulsions, many of these dyes are useful in supersensitizing certain cyanine dyes, some of which likewise have little sensitizing effect on such emulsions. For example, while both 3-methyl-1-phenyl-4-[(1,3,3-trimethyl-2-(1)-indolylidene)methylimino]-5-pyrazolone (Example 1) and 3-methyl-1-(p-sulfophenyl)-4-[(3-ethyl-2(3)-benzothiazolylidene)isopropylidene]-5-pyrazolone (L. G. S. Brooker and F. L. White, U. S. application Serial No. 605,472, filed July 16, 1945) sensitize photographic silver halide emulsions very weakly, a combination of these dyes in a slow silver chlorobromiodide emulsion causes a marked increase in the speed of the emulsion. Some of the azamerocarbocyanine dyes of our invention are also useful in the preparation of photographic filter layers, etc.

What we claim as our invention and desire secured by Letters Patent of the United States is:

1. A dye selected from those represented by the following general formula:

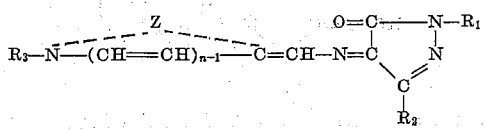

wherein $R_1$ represents a member selected from the group consisting of a primary alkyl group of the formula $C_mH_{2m+1}$ wherein $m$ represents a positive integer from 1 to 4, an aryl group of the benzene series, an aryl group of the naphthalene series and a benzothiazolyl group, $R_2$ represents a member selected from the group consisting of a primary alkyl group of the formula $C_mH_{2m+1}$ wherein $m$ represents a positive integer from 1 to 4, an aryl group of the benzene series and an aryl group of the naphthalene series, $n$ represents a positive integer from 1 to 2, $R_3$ represents a primary alkyl group of the formula $C_mH_{2m+1}$ wherein $m$ represents a positive integer from 1 to 4, and Z represents the non-metallic atoms necessary to complete a heterocyclic nucleus selected from the group consisting of those of the thiazole series, those of the benzothiazole series, those of the naphthothiazole series, those of the thionaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series and those of the pyridine series.

2. The compound represented by the following formula:

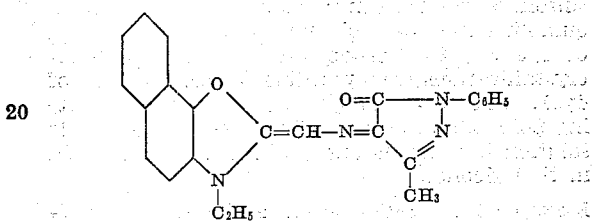

3. The dye represented by the following formula:

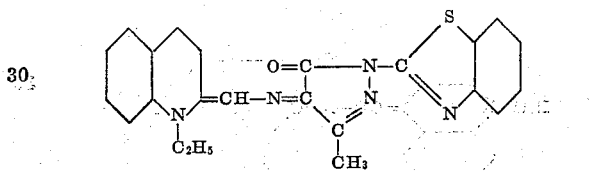

4. A process for preparing a methine dye comprising condensing in the presence of an alkali metal carboxylate in a carboxylic anhydride a cyclammonium quaternary salt selected from those represented by the following general formula:

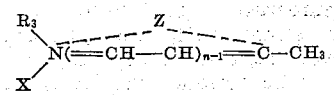

wherein $R_3$ represents a primary alkyl group of the formula $C_mH_{2m+1}$ wherein $m$ represents a positive integer from 1 to 4, $n$ represents a positive integer from 1 to 2, X represents an anion, Z represents the non-metallic atoms necessary to complete a heterocyclic nucleus selected from the group consisting of those of the thiazole series, those of the benzothiazole series, those of the naphthothiazole series, those of the thionaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series and those of the pyridine series, with a 4-isonitrosopyrazolone selected from those represented by the following general formula:

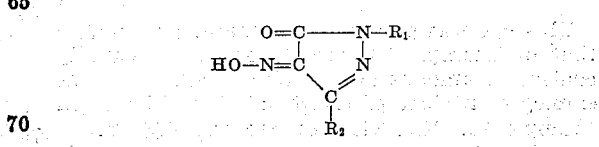

wherein $R_1$ represents a member selected from the group consisting of a primary alkyl group of the formula $C_mH_{2m+1}$ wherein $m$ represents a positive integer from 1 to 4, an aryl group of the benzene series, an aryl group of the naphthalene series and a benzothiazolyl group, and R₂ represents a member selected from the group consisting of a primary alkyl group of the formula $C_mH_{2m+1}$ wherein $m$ represents a positive integer from 1 to 4, an aryl group of the benzene series and an aryl group of the naphthalene series.

5. The dye represented by the following formula:

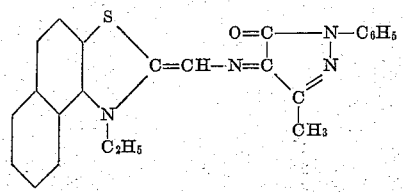

6. The dye having the following formula:

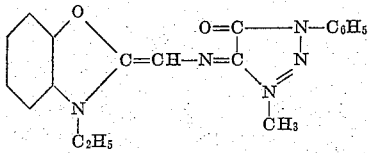

7. The dye having the following formula:

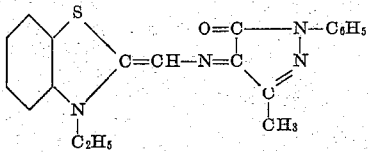

8. A process for preparing 4-[(3-ethyl-2(3)-benzothiazolylidene)methylimino]-3-methyl-1-phenyl-5-pyrazolone comprising condensing in the presence of an alkali metal carboxylate in a carboxylic anhydride 2-methylbenzothiazole etho-p-toluenesulfonate with 4-isonitroso-3-methyl-1-phenyl-5-pyrazolone.

9. A process for preparing 4-[(3-ethyl-2(3)-α-naphthoxazolylidene)methylimino]-3-methyl-1-phenyl-5-pyrazolone comprising condensing in the presence of an alkali metal carboxylate in a carboxylic anhydride 2-methyl-α-naphthoxazole ethiodide with 4-isonitroso-3-methyl-1-phenyl-5-pyrazolone.

10. A process for preparing 1-(2-benzothiazolyl)-4-[(3-ethyl-2(3)-benzothiazolylidene)methylimino]-3-methyl-5-pyrazolone comprising condensing in the presence of an alkali metal carboxylate in a carboxylic anhydride 2-methylbenzothiazole etho-p-toluenesulfonate with 1-(2-benzothiazolyl)-4-isonitroso-3-methyl-5-pyrazolone.

11. A process for preparing 4-[(1-ethyl-2(1)-β-naphthothiazolylidene)methylimino]-3-methyl-1-phenyl-5-pyrazolone comprising condensing in the presence of an alkali metal carboxylate in a carboxylic anhydride 2-methyl-β-naphthothiazole etho-p-toluenesulfonate with 4-isonitroso-3-methyl-1-phenyl-5-pyrazolone.

12. A process for preparing 4-[(3-ethyl-2(3)-benzoxazolylidene)methylimino]-3-methyl-1-phenyl-5-pyrazolone comprising condensing in the presence of an alkali metal carboxylate in a carboxylic anhydride 2-methylbenzoxazole ethiodide with 4-isonitroso-3-methyl-1-phenyl-5-pyrazolone.

LESLIE G. S. BROOKER.
FRANK L. WHITE.

References Cited in the file of this patent

UNITED STATES PATENTS

| Number | Name | Date |
|---|---|---|
| 1,973,462 | Brooker | Sept. 11, 1934 |
| 1,990,682 | White | Feb. 12, 1935 |
| 1,994,563 | Brooker | Mar. 19, 1935 |
| 2,028,141 | Ackeman | Jan. 21, 1936 |
| 2,165,219 | Brooker | July 11, 1939 |
| 2,211,762 | Brooker | Aug. 20, 1940 |
| 2,265,908 | Kendall | Dec. 9, 1941 |
| 2,394,068 | Kendall | Feb. 5, 1946 |
| 2,496,899 | Thompson | Feb. 7, 1950 |